(12) United States Patent
Schmitz et al.

(10) Patent No.: US 11,376,939 B2
(45) Date of Patent: Jul. 5, 2022

(54) VEHICULAR SEAL CARRIER SYSTEM

(71) Applicant: Faraday & Future Inc., Gardena, CA (US)

(72) Inventors: Jordan William Schmitz, Hermosa Beach, CA (US); Paul G. Jabra, Troy, MI (US); Matthew Richard Partsch, San Pedro, CA (US); Carlos David Tobon, San Pedro, CA (US)

(73) Assignee: Faraday&Future Inc., Gardena, CA (US)

( * ) Notice: Subject to any disclaimer, the term of this patent is extended or adjusted under 35 U.S.C. 154(b) by 76 days.

(21) Appl. No.: 16/012,693

(22) Filed: Jun. 19, 2018

(65) Prior Publication Data

US 2019/0381875 A1    Dec. 19, 2019

(51) Int. Cl.
     *B60J 10/76*      (2016.01)

(52) U.S. Cl.
     CPC ..................... *B60J 10/76* (2016.02)

(58) Field of Classification Search
     CPC ... B60J 10/24; B60J 10/84; B60J 10/86; B60J 10/80; B60J 5/0479; B60J 10/32; B60J 5/06; B60J 10/30; B60J 10/87
     USPC ........ 296/146.9, 202, 155, 1.08, 209, 146.8, 296/97.22, 76, 57.1, 50; 49/475.1, 503, 49/168, 358, 460, 504, 498.1, 465, 383
     See application file for complete search history.

(56) References Cited

U.S. PATENT DOCUMENTS

| | | | | |
|---|---|---|---|---|
| 8,215,701 B1* | 7/2012 | Mori | ........................ | B60J 10/24 |
| | | | | 296/146.9 |
| 8,572,897 B2* | 11/2013 | Dishman | .................. | B60J 10/21 |
| | | | | 49/377 |
| 2006/0156632 A1* | 7/2006 | Ruppert | ............ | B29C 45/14377 |
| | | | | 49/502 |
| 2009/0072581 A1* | 3/2009 | Rich | ........................ | B60J 10/24 |
| | | | | 296/146.9 |
| 2012/0025564 A1* | 2/2012 | Ellis | ........................ | B60J 10/79 |
| | | | | 296/146.9 |
| 2012/0223542 A1* | 9/2012 | Nishimoto | ................ | B60J 10/24 |
| | | | | 296/146.9 |
| 2013/0160375 A1* | 6/2013 | Kuwabara | ............. | E06B 7/2303 |
| | | | | 49/490.1 |
| 2013/0175823 A1* | 7/2013 | Priess | ...................... | B60J 10/24 |
| | | | | 296/146.9 |
| 2015/0076856 A1* | 3/2015 | Masumoto | ............... | B60J 10/24 |
| | | | | 296/146.9 |

(Continued)

*Primary Examiner* — D Glenn Dayoan
*Assistant Examiner* — Sunsurraye Westbrook
(74) *Attorney, Agent, or Firm* — Veros Legal Solutions, LLP (57) ABSTRACT

A seal system for retaining a seal in between a fixed quarter glass and a moveable window glass can include a first seal carrier attached to the fixed quarter glass, a second seal carrier attached to the first seal carrier, a seal retained by the first and second seal carriers, and a beauty cover disposed over the first and second seal carriers when viewed from inside a vehicle. The seal system can be assembled by attaching the first seal carrier to the quarter glass, joining the second seal carrier to the first seal carrier, placing the seal such that it is retained by the first and second seal carriers, and fitting the first and second seal carriers with the beauty cover. When assembled, the seal system retains the seal to seal the vehicle between the fixed quarter glass and the movable window glass.

20 Claims, 5 Drawing Sheets

(56) References Cited

U.S. PATENT DOCUMENTS

| | | | |
|---|---|---|---|
| 2015/0143753 A1* | 5/2015 | Kim | B60J 10/24 |
| | | | 49/498.1 |
| 2015/0183307 A1* | 7/2015 | Hakamada | B60J 5/107 |
| | | | 296/146.9 |
| 2015/0273993 A1* | 10/2015 | Sobue | B60J 10/277 |
| | | | 296/146.9 |
| 2018/0141601 A1* | 5/2018 | Koike | B29C 45/2608 |

* cited by examiner

VEHICULAR SEAL CARRIER SYSTEM

FIELD OF THE DISCLOSURE

The present invention relates to an automotive seal and more particularly to a seal system for retaining a seal in between a fixed quarter glass and a moveable window glass.

BACKGROUND

Consumer automobiles typically include multiple glass windows, such as movable windows attached to doors and fixed windows attached to the body of the vehicle. In some examples, windows attached to doors are framed by a door structure including seals. Such vehicles can further include seals around the doors, for example. Further, some vehicles include multiple seals around the doors, such as one seal attached to the door structure and another seal attached to the body structure of the vehicle that makes contact with the door (e.g., the doorway). In some examples, the seals can be attached directly to the structure of the doors or the vehicle body structure. Additionally or alternatively, seals may be supported by a seal carrier. Seal carriers can be attached to the door structure or the vehicle body structure to retain the seals.

SUMMARY

The present invention relates to an automotive seal and more particularly to a seal system for retaining a seal in between a fixed quarter glass and a moveable window glass. In some embodiments, the seal system includes a first seal carrier attached to the fixed quarter glass, a second seal carrier attached to the first seal carrier, a seal retained by the first and second seal carriers, and a beauty cover disposed over the first and second seal carriers when viewed from inside the vehicle. The first seal carrier can be bonded to the fixed quarter glass by an encapsulation layer. The first and second seal carriers can be joined by retention tabs included in each seal carrier. When joined, the first and second seal carriers can retain a seal using seal clips included in each seal carrier. In some embodiments, the beauty cover is attached to the first seal carrier and the second seal carrier with a sliding motion that enables the beauty cover to be removed and replaced if desired.

DETAILED DESCRIPTION

In the following description, references are made to the accompanying drawings that form a part hereof, and in which it is shown by way of illustration specific examples that can be practiced. It is to be understood that other examples can be used and structural changes can be made without departing from the scope of the disclosed examples.

The present invention relates to an automotive seal and more particularly to a seal system for retaining a seal in between a fixed quarter glass and a moveable window glass. In some embodiments, the seal system includes a first seal carrier attached to the fixed quarter glass, a second seal carrier attached to the first seal carrier, a seal retained by the first and second seal carriers, and a beauty cover disposed over the first and second seal carriers when viewed from inside the vehicle. The first seal carrier can be bonded to the fixed quarter glass by an encapsulation layer. The first and second seal carriers can be joined by retention tabs included in each seal carrier. When joined, the first and second seal carriers can retain a seal using seal clips included in each seal carrier. In some embodiments, the beauty cover is attached to the first seal carrier and the second seal carrier with a sliding motion that enables the beauty cover to be removed and replaced if desired.

Figure 1:
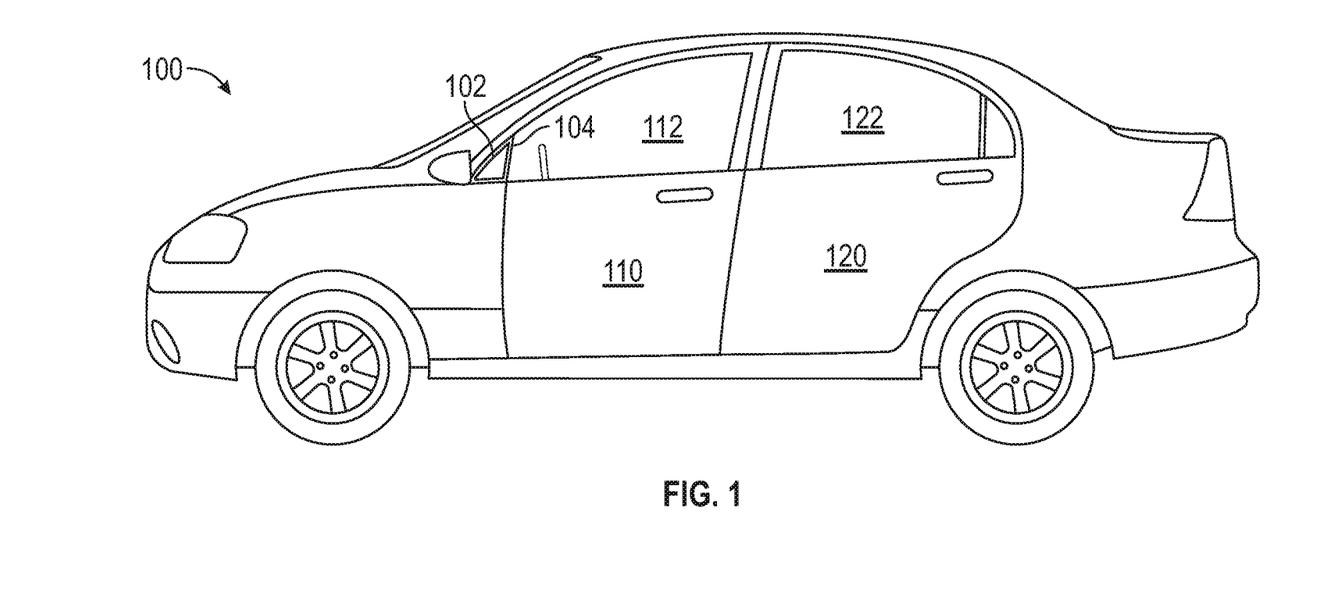
FIG. 1 illustrates a vehicle according to examples of the disclosure.

FIG. 1 illustrates a vehicle 100 according to examples of the disclosure. Vehicle 100 includes front door 110 and back door 120, though in some examples other numbers of doors are possible. The front door 110 can include a front window 112 and the back door 120 can include a back window 122. The body of the vehicle 100 can further include quarter glass 102 adjacent to front window 112.

In some examples, quarter glass 102 and front window 112 are separated by a body structure including one or more seals 104. The one or more seals 104 can prevent water from entering vehicle 100 between the quarter glass 102 and the front window 112 when the front window is closed, while still allowing the front window to move up and down to open and close. Although the body structure can support the one or more seals 104, in some examples, the body structure between the quarter glass 102 and the front window 112 can be eliminated to reduce packaging space and improve user visual experience.

In some examples where there is no body structure between quarter glass 102 and front window 112, the one or more seals 104 can be mounted to the quarter glass 102 by a seal carrier system attached to the quarter glass. Examples of the disclosure including seal carrier systems mounted to the quarter glass 102 are described below with reference to FIGS. 2-5C.

Figure 2:
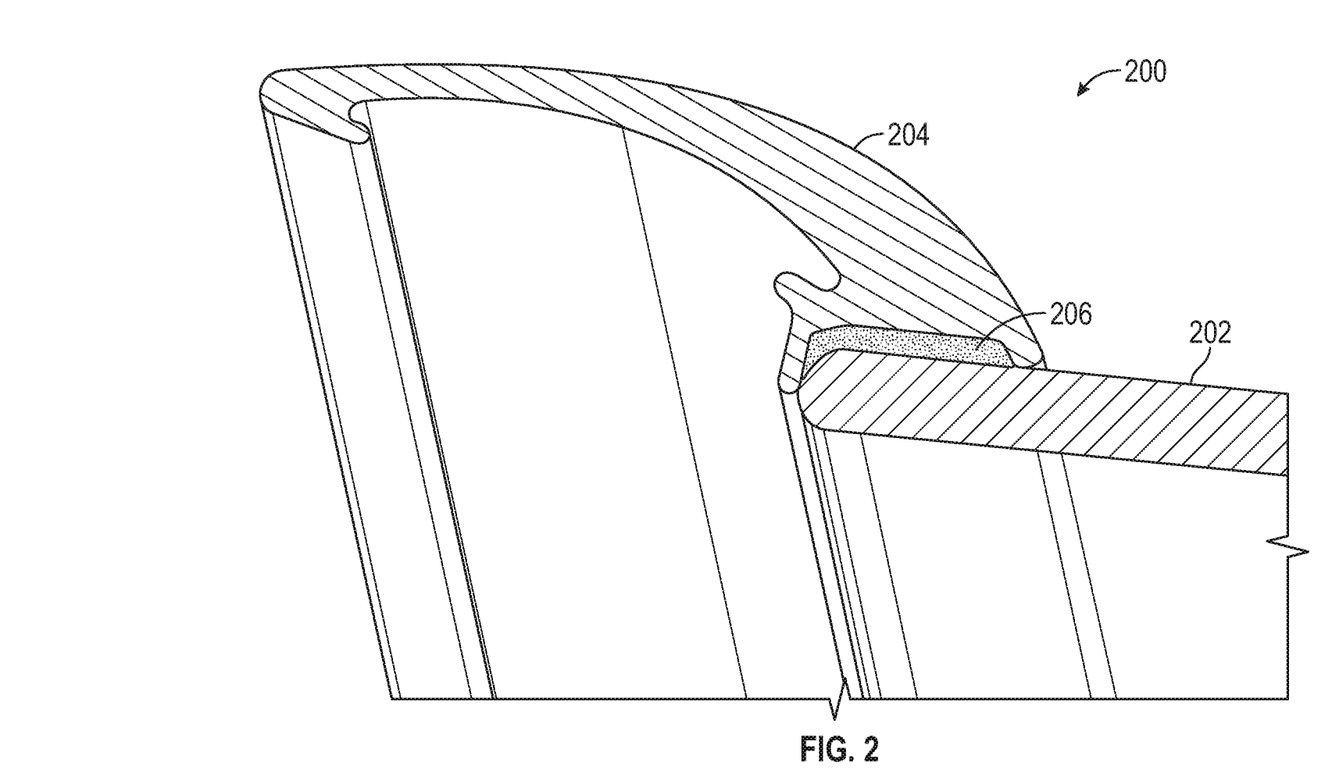
FIG. 2 illustrates a seal carrier system according to examples of the disclosure.

FIG. 2 illustrates a seal carrier system 200 according to examples of the disclosure. In some embodiments, seal carrier system 200 includes a seal carrier 204 attached to the quarter glass 202 using an adhesive 206. Seal carrier system 200 can retain a seal for preventing water from entering the vehicle between quarter glass 202 and an adjacent window. Seal carrier system 200 can be used to attach a seal to the quarter glass 202 without the use of a body structure located at the quarter glass 202. In this way, an A-pillar of the vehicle body structure located on the vehicle body between the quarter glass 202 and the door glass can be eliminated. Further, providing a single seal mounted to the quarter glass 202 can seal the space between the quarter glass and a frameless window glass, thereby improving the appearance of the vehicle incorporating seal carrier system 200. That is to say, the vehicle door can exclude a frame structure surrounding the window.

Although adhesive 206 may attach seal carrier 204 to quarter glass 202 to provide a mounting location of a seal between the quarter glass and a moveable window glass (e.g., a window that can move up and down to open and close), in some examples, there can be problems associated with such an arrangement. For example, aligning the seal carrier 204 on the glass during manufacturing to adhere it in the correct position can be difficult to execute with consistency, leading to inconsistent parts and/or a high scrap rate. Further, it is possible that adhesive 206 could degrade over time, reducing the effectiveness of the seal. Additionally, servicing certain component parts of the seal carrier system 200 could require replacing the whole system 200. In other words, if the seal carrier 204 becomes damaged, the seal carrier system 200 including quarter glass 202 may have to be replaced because the seal carrier 204 is adhered to the quarter glass 202. For these reasons, it can sometimes be advantageous to attach seal carrier 204 to quarter glass 202 in a different manner.

Figure 3:
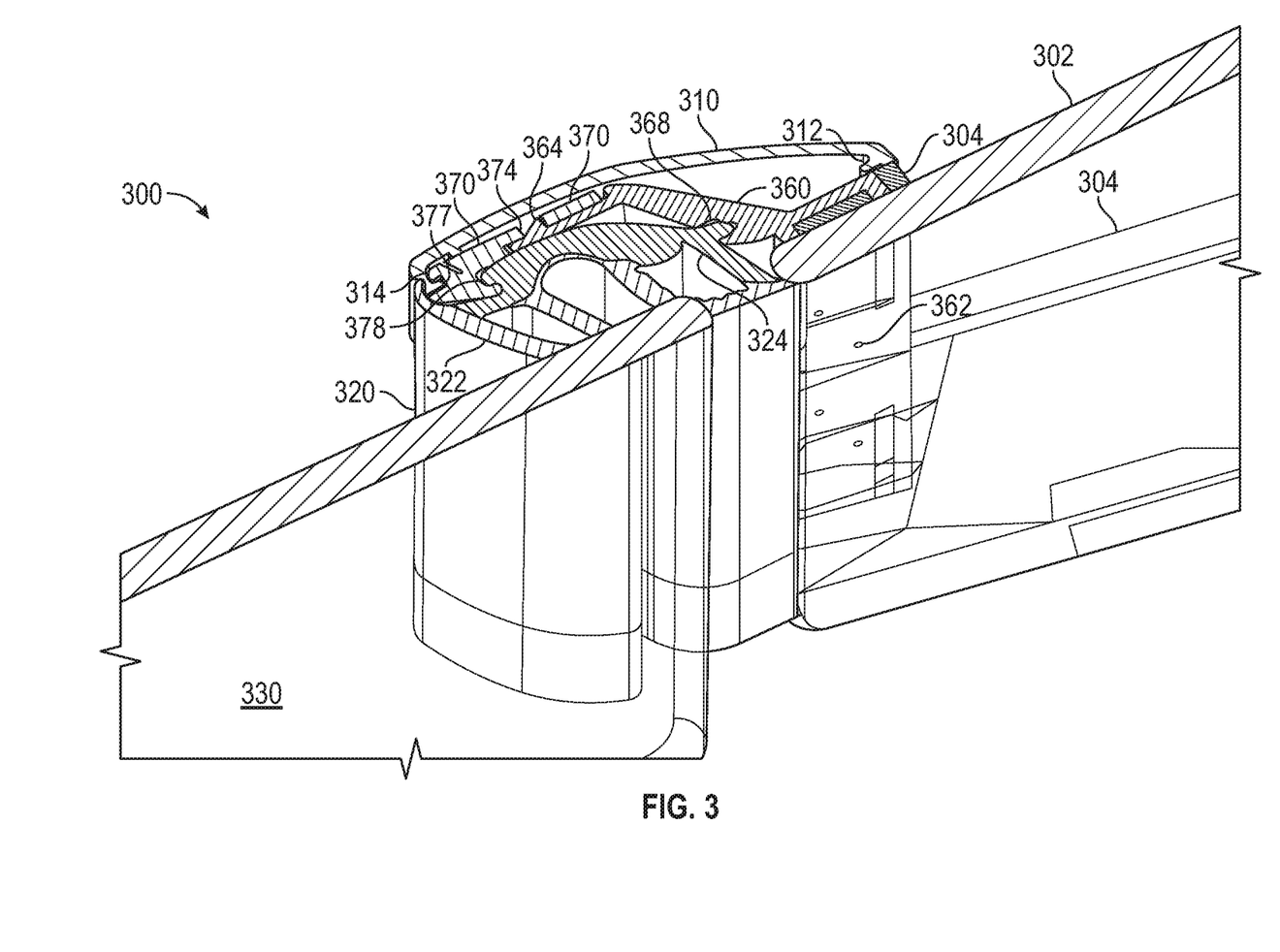
FIG. 3 illustrates a seal system according to examples of the disclosure.

FIG. 3 illustrates a seal system 300 according to examples of the disclosure. In some examples, seal system 300 includes quarter glass 302, quarter glass encapsulation 304, a first seal carrier 360, a second seal carrier 370, beauty cover 310, seal 320, and window glass 330. The first seal carrier 360 can be attached to quarter glass 302 by encapsulation 304, thereby eliminating the need for a body panel structure (e.g., an A-pillar) between the quarter glass 302 and the window glass 330 without the use of an adhesive, for example. Further, providing a seal mounted to the quarter glass 302 can allow the window glass 330 to be retained in the door without a door frame structure surrounding the window.

In some embodiments, seal 320 can be a continuous piece manufactured from a relatively firm material 324 and a relatively soft material 322. The relatively firm material 324 can be attached to the first seal carrier 360 and second seal carrier 370 to create a durable connection. The relatively soft material 322 can provide a flexible sealing surface that makes contact with window glass 330. First seal carrier 360 can include holes 362, retention tabs 364, and seal clip 368. Second seal carrier 370 can include retention tabs 374, beauty cover clip 377, and seal clip 378. The first seal carrier 360 and the second seal carrier 370 can include a durable material, such as a durable plastic material. Beauty cover 310 can also include a first clip 312 and a second clip 314. Beauty cover 310 can include a durable material such as plastic or anodized aluminum and can have a high gloss or other aesthetic surface.

In some embodiments, seal system 300 is assembled to retain seal 320 between quarter glass 302 and window glass 330. First seal carrier 360 can be attached to quarter glass 302 (e.g., quarter glass 102 of vehicle 100) using an encapsulation 304 applied to the quarter glass, for example. The encapsulation 304 can include a rubber material. When the first seal carrier 360 is attached to the quarter glass 302 with the encapsulation 304, some of the encapsulation 304 can enter holes 362 of the first seal carrier 360, forming a secure bond. In some embodiments, joining the first seal carrier 360 to the quarter glass 302 in this way can improve the alignment of the first seal carrier 360 relative to the quarter glass 302 and create a more durable bond than a bond created by an adhesive. The second seal carrier 370 can be connected to the first seal carrier 360 by retention tabs 364 and 374. Providing separate seal carriers that can be snapped together allows the seal carriers to be manufactured separately for simplified production.

In some embodiments, beauty cover 310 can be connected to the first seal carrier 360 and the second seal carrier 370 to conceal the first seal carrier 360 and the second seal carrier 370 from inside the vehicle. That is to say, in some embodiments, beauty cover 310 is located inside the vehicle. Beauty cover 310 can be attached to the first seal carrier 360 by substrates including overhangs at the first clip 312 of the beauty cover 310, as will be described below with reference to FIGS. 4A-5C. Beauty cover 310 can be attached to the second seal carrier 370 by beauty cover clip 377 included in the second seal carrier 370 at the second clip 314 of the beauty cover 310. In some embodiments, beauty cover 310 can be applied to the first seal carrier 360 and the second seal carrier 370 with a sliding motion, thereby allowing the beauty cover 310 to be removed for servicing or to be replaced if it becomes damaged, for example. That is to say, the beauty cover 310 can be slideably removable from the first seal carrier 360 and the second seal carrier 370.

Seal 320 can be retained by the first seal carrier 360 and the second seal carrier 370 to seal the space between the quarter glass 302 and window glass 330. In some embodiments, first seal carrier 360 can include seal clip 368 and second seal carrier 370 can include seal clip 378 to hold the seal 320 in place as illustrated in FIG. 3. Once the vehicle is assembled, the quarter glass 302 can be fixed in place relative to the body of the vehicle and the window glass 330 can move. For example, window glass 330 can be raised or lowered to open or close the window and move away from the vehicle body when a door (e.g., front door 110) is opened or closed. In some embodiments, the seal 320 includes a relatively soft material 322 in a section that makes contact with the window glass 330, thereby allowing the seal 320 to bend when the window glass moves. The seal 320 can further include a relatively firm material 324 connected to the first seal carrier 360 and the second seal carrier 370, thereby allowing the seal 320 to be firmly attached to the seal carrier assembly. The relatively soft and relatively firm materials 322, 324 can be, for example, a lower durometer EPDM rubber material and a higher durometer EPDM rubber material. Alternatively or additionally, the relatively soft and relatively firm materials 322, 324 can be plastic materials. Selected parts of seal system 300 and the assembly of seal system 300 will now be described in more detail with reference to FIGS. 4A-4C.

Figure 4A:
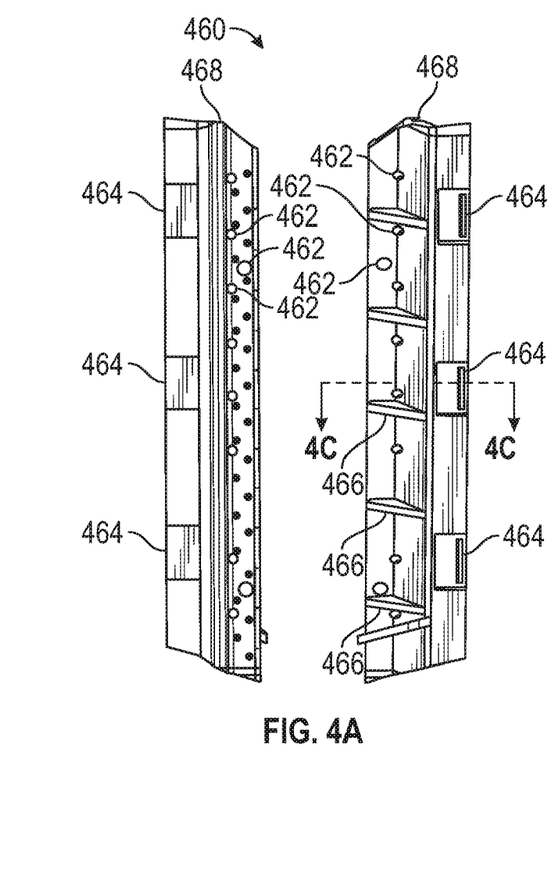
FIG. 4A illustrates a first seal carrier according to examples of the disclosure.

FIG. 4A illustrates a first seal carrier 460 according to examples of the disclosure. In some embodiments, the first seal carrier 460 includes holes 462, retention tabs 464, substrates 466, and seal clip 468. The first seal carrier 460 can include a plastic material. In some embodiments, holes 462 can be included on a surface of the first seal carrier 460 for accommodating an encapsulation (e.g., encapsulation 304) applied to the quarter glass (e.g., quarter glass 102, 202, or 302) to join the first seal carrier 460 to the quarter glass in an over-molding process. Retention tabs 464 can include raised tabs surrounded by recessed surfaces to allow the first seal carrier 460 to be joined to a second seal carrier (e.g., second seal carrier 370, described above, or 470, described below). In some embodiments, substrates 466 provide structural support to the first seal carrier 460 and can include undercuts at which a beauty cover (e.g., beauty cover 310) can attach. The first seal carrier 460 can further include seal clip 468 to accommodate the seal (e.g., seal 320) in the seal assembly (e.g., seal assembly 300).

Figure 4B:
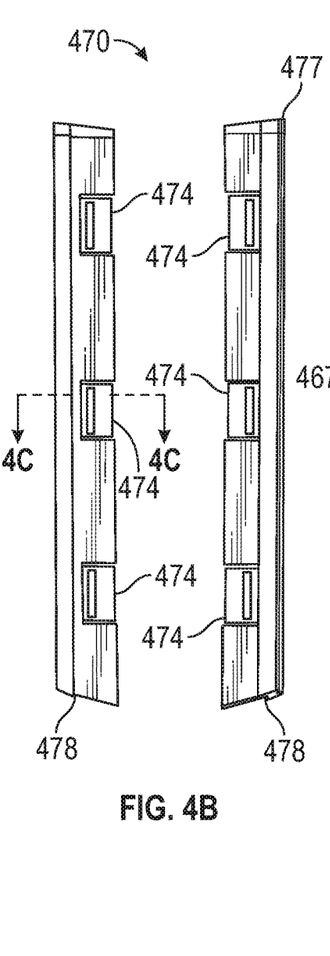
FIG. 4B illustrates a second seal carrier according to examples of the disclosure.

FIG. 4B illustrates a second seal carrier 470 according to examples of the disclosure. In some embodiments, the second seal carrier 470 includes retention tabs 474, beauty cover clip 477, and seal clip 478. The second seal carrier 470 can include a plastic material. In some embodiments, retention tabs 474 can include holes that accommodate the raised tabs of the retention tabs 464 of the first seal carrier 460. Beauty cover clip 477 can be disposed along an edge of the second seal carrier 470 to provide a location at which the beauty cover (e.g., beauty cover 310) can attach to the second seal carrier 470 when it is assembled with the first seal carrier 460. In some embodiments, seal clip 478 is provided as a location at which the seal (e.g., seal 320) can attach to the second seal carrier 470 when it is assembled with the first seal carrier 460.

Figure 4C:
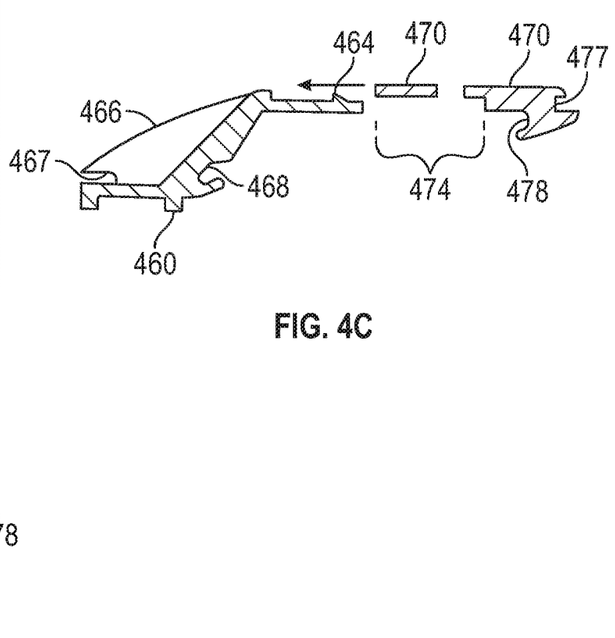
FIG. 4C illustrates a cross-section of a first seal carrier and a second seal carrier according to examples of the disclosure.

FIG. 4C illustrates a cross-section of a first seal carrier 460 and a second seal carrier 470 according to examples of the disclosure. Specifically, FIG. 4C illustrates how the first seal carrier 460 and the second seal carrier 470 can be joined together by retention tabs 464 and 474. Once assembled, a beauty cover (e.g., beauty cover 310) can be attached by undercuts 467 of substrates 466 on the first seal carrier 460 and by beauty cover clip 477 of the second seal carrier 470, for example. In some embodiments, a seal (e.g., seal 320) can be held in place by seal clips 468 and 478, as shown in FIG. 3.

Figure 5A:
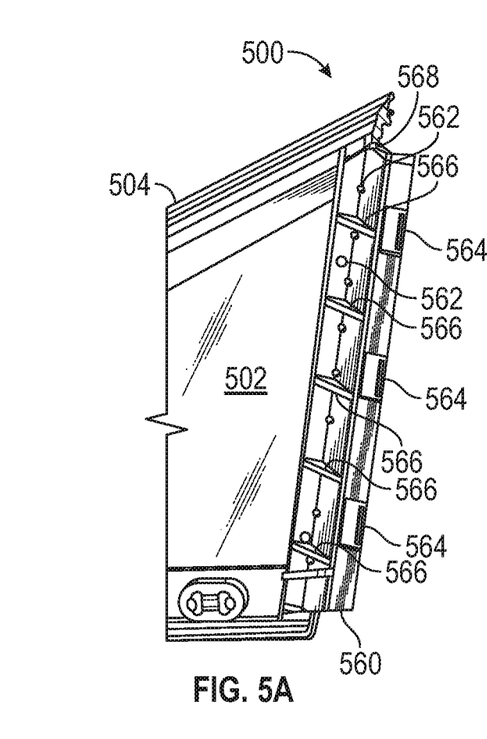
FIGS. 5A-5C illustrate steps for assembling a seal carrier assembly according to examples of the disclosure.
Figure 5B:
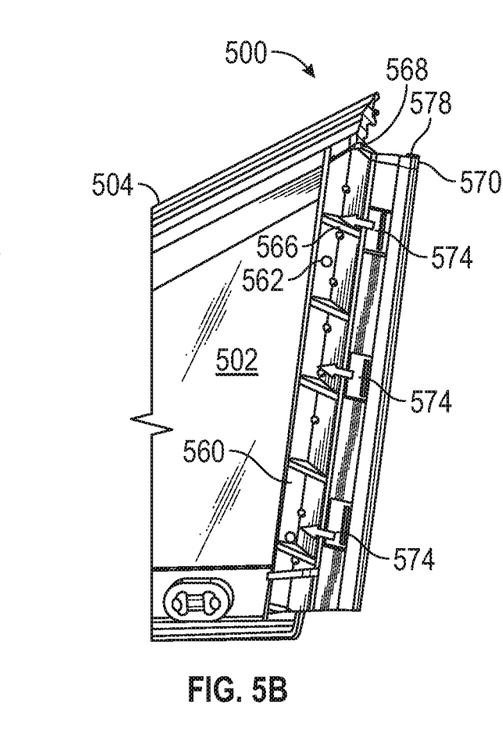
Figure 5C:
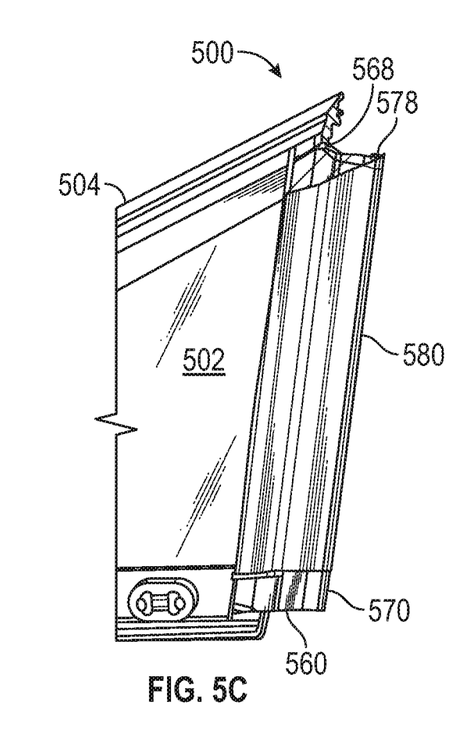

FIGS. 5A-5C illustrate steps for assembling a seal carrier assembly 500 according to examples of the disclosure. In some embodiments, the quarter glass 502, the first seal carrier 560, the second seal carrier 570, and the beauty cover 580 can be assembled to retain a seal (e.g., seal 320) between the quarter glass 502 and a window glass.

FIG. 5A illustrates the first seal carrier 560 attached to the quarter glass 502 by encapsulation 504. In some embodiments, first seal carrier 560 is positioned on quarter glass 502 while encapsulation 504 is applied, thereby binding the first seal carrier 560 to the quarter glass 502. Similar to first seal carrier 460, first seal carrier 560 can include holes 562, retention tabs 564, substrates 566, and seal clip 568.

FIG. 5B illustrates the second seal carrier 570 attached to the first seal carrier 560 and the quarter glass 502. In some embodiments, second seal carrier 570 includes retention tabs 574 and seal clip 578, and any other components included in second seal carrier 570 (e.g., beauty cover clip 477). The second seal carrier 570 and first seal carrier 560 can be connected by retention tabs 564 and 574, for example.

FIG. 5C illustrates the beauty cover 580 attached to the first seal carrier 560, the second seal carrier 570, and the quarter glass 502. Beauty cover 580 can be fitted to the first seal carrier 560 and the second seal carrier 570 using overhangs of substrates 566 of the first seal carrier (e.g., overhang 467 of first seal carrier 460) and a beauty cover clip of the second seal carrier (e.g., beauty cover clip 477 of second seal carrier 470), for example. In some embodiments, beauty cover 580 is placed such that the first seal carrier 560 and the second seal carrier 570 are concealed from the inside of the vehicle.

Therefore, according to the above, some examples of the disclosure are directed to a seal system for use in a vehicle, comprising: a first seal carrier attached to a quarter glass of the vehicle; a second seal carrier attached to the first seal carrier; a beauty cover attached to the first seal carrier and the second seal carrier; and a seal attached to the first seal carrier and to the second seal carrier such that the first seal carrier and second seal carrier are located between the seal and the beauty cover. Additionally or alternatively, in some examples the first seal carrier is attached to the quarter glass via a rubber encapsulation. Additionally or alternatively, in some examples the first seal carrier comprises a plurality of holes configured to receive rubber encapsulation material. Additionally or alternatively, in some examples the first seal carrier comprises first retention tabs, the second seal carrier comprises second retention tabs, and the first seal carrier and the second seal carrier are attached by the first retention tabs and the second retention tabs. Additionally or alternatively, in some examples one of the first retention tabs and the second retention tabs comprise raised tabs, and another of the first retention tabs and the second retention tabs comprise holes configured to accommodate the raised tabs of the one of the first retention tabs and the second retention tabs. Additionally or alternatively, in some examples the beauty cover includes a clip, the first seal carrier comprises a plurality of substrates, each substrate having an undercut at one of its edges, and the beauty cover and the first seal carrier are attached by the undercuts of the plurality of substrates and the clip. Additionally or alternatively, in some examples the beauty cover includes a first clip, the second seal carrier comprises a second clip, and the beauty cover and the second seal carrier are attached by the first clip and the second clip. Additionally or alternatively, in some examples the beauty cover is slideably removable from the first seal carrier and the second seal carrier. Additionally or alternatively, in some examples the first seal carrier includes a first seal clip, the second seal carrier includes a second seal clip, and the seal is retained by the first seal clip and the second seal clip.

Some examples of the disclosure are directed to a vehicle comprising: a vehicle body; a quarter glass fixed to the vehicle body; a door; a window glass retained by the door; and a seal system comprising: a first seal carrier attached to the quarter glass; a second seal carrier attached to the first seal carrier; a beauty cover attached to the first seal carrier and the second seal carrier; and a seal attached to the first seal carrier and the second seal carrier such that the first seal carrier and second seal carrier are between the seal and the beauty cover. Additionally or alternatively, in some examples the beauty cover is disposed in an inside of the vehicle. Additionally or alternatively, in some examples a position of the quarter glass relative to the vehicle body is fixed, and the window glass is configured to move up and down relative to the door. Additionally or alternatively, in some examples the first seal carrier is attached to the quarter glass via a rubber encapsulation. Additionally or alternatively, in some examples the first seal carrier comprises a plurality of holes configured to accommodate rubber encapsulation material. Additionally or alternatively, in some examples the first seal carrier comprises first retention tabs, the second seal carrier comprises second retention tabs, and the first seal carrier and the second seal carrier are attached by the first retention tabs and the second retention tabs. Additionally or alternatively, in some examples one of the first retention tabs and the second retention tabs comprise raised tabs, and another of the first retention tabs and the second retention tabs comprise holes configured to accommodate the raised tabs of the one of the first retention tabs and the second retention tabs. Additionally or alternatively, in some examples the beauty cover includes a clip, the first seal carrier comprises a plurality of substrates, each substrate having an undercut at one of its edges, and the beauty cover and the first seal carrier are attached by the undercuts of the plurality of substrates and the clip. Additionally or alternatively, in some examples the beauty cover includes a first clip, the second seal carrier comprises a second clip, and the beauty cover and the second seal carrier are attached by the first clip and the second clip. Additionally or alternatively, in some examples the beauty cover is slideably removable from the first seal carrier and the second seal carrier. Additionally or alternatively, in some examples the first seal carrier includes a first seal clip, the second seal carrier includes a second seal clip, and the seal is retained by the first seal clip and the second seal clip.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A seal system for use in a vehicle, comprising:
   a first seal carrier attached to a quarter glass of the vehicle;
   a second seal carrier attached to the first seal carrier;
   a beauty cover attached to the first seal carrier and the second seal carrier; and
   a seal attached to the first seal carrier and to the second seal carrier such that the first seal carrier and second seal carrier are located between the seal and the beauty cover.

2. The seal system of claim 1, wherein the first seal carrier is attached to the quarter glass via a rubber encapsulation.

3. The seal system of claim 2, wherein the first seal carrier comprises a plurality of holes configured to receive rubber encapsulation material.

4. The seal system of claim 1, wherein: the first seal carrier comprises first retention tabs, the second seal carrier comprises second retention tabs, and the first seal carrier and the second seal carrier are attached by the first retention tabs and the second retention tabs.

5. The seal system of claim 4, wherein: one of the first retention tabs and the second retention tabs comprise raised tabs, and another of the first retention tabs and the second retention tabs comprise holes configured to accommodate the raised tabs of the one of the first retention tabs and the second retention tabs.

6. The seal system of claim 1, wherein: the beauty cover includes a clip, the first seal carrier comprises a plurality of substrates, each substrate having an undercut at one of its edges, and the beauty cover and the first seal carrier are attached by the undercuts of the plurality of substrates and the clip.

7. The seal system of claim 1, wherein: the beauty cover includes a first clip, the second seal carrier comprises a second clip, and the beauty cover and the second seal carrier are attached by the first clip and the second clip.

8. The seal system of claim 1, wherein: the beauty cover is slideably removable from the first seal carrier and the second seal carrier.

9. The seal system of claim 1, wherein: the first seal carrier includes a first seal clip, the second seal carrier includes a second seal clip, and the seal is retained by the first seal clip and the second seal clip.

10. A vehicle comprising:
    a vehicle body;
    a quarter glass fixed to the vehicle body;
    a door;
    a window glass retained by the door; and
    a seal system comprising:
       a first seal carrier attached to the quarter glass;
       a second seal carrier attached to the first seal carrier;
       a beauty cover attached to the first seal carrier and the second seal carrier; and
       a seal attached to the first seal carrier and the second seal carrier such that the first seal carrier and second seal carrier are between the seal and the beauty cover.

11. The vehicle of claim 10, wherein the beauty cover is disposed in an inside of the vehicle.

12. The vehicle of claim 10, wherein: a position of the quarter glass relative to the vehicle body is fixed, and the window glass is configured to move up and down relative to the door.

13. The vehicle of claim 10, wherein the first seal carrier is attached to the quarter glass via a rubber encapsulation.

14. The vehicle of claim 13, wherein the first seal carrier comprises a plurality of holes configured to accommodate rubber encapsulation material.

15. The vehicle of claim 10, wherein: the first seal carrier comprises first retention tabs, the second seal carrier comprises second retention tabs, and the first seal carrier and the second seal carrier are attached by the first retention tabs and the second retention tabs.

16. The vehicle of claim 15, wherein: one of the first retention tabs and the second retention tabs comprise raised tabs, and another of the first retention tabs and the second retention tabs comprise holes configured to accommodate the raised tabs of the one of the first retention tabs and the second retention tabs.

17. The vehicle of claim 10, wherein: the beauty cover includes a clip, the first seal carrier comprises a plurality of substrates, each substrate having an undercut at one of its edges, and the beauty cover and the first seal carrier are attached by the undercuts of the plurality of substrates and the clip.

18. The vehicle of claim 10, wherein: the beauty cover includes a first clip, the second seal carrier comprises a second clip, and the beauty cover and the second seal carrier are attached by the first clip and the second clip.

19. The vehicle of claim 10, wherein: the beauty cover is slideably removable from the first seal carrier and the second seal carrier.

20. The vehicle of claim 10, wherein: the first seal carrier includes a first seal clip, the second seal carrier includes a second seal clip, and the seal is retained by the first seal clip and the second seal clip.

* * * * *